United States Patent
Narumi et al.

(10) Patent No.: US 7,193,947 B1
(45) Date of Patent: Mar. 20, 2007

(54) OPTICAL INFORMATION RECORDING METHOD, OPTICAL INFORMATION RECORDING DEVICE AND OPTICAL INFORMATION RECORDING MEDIUM

(75) Inventors: Kenji Narumi, Ibaraki (JP); Kenichi Nishiuchi, Hirakata (JP); Noboru Yamada, Hirakata (JP); Takeo Ohta, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 961 days.

(21) Appl. No.: 09/980,109

(22) PCT Filed: May 30, 2000

(86) PCT No.: PCT/JP00/03480

§ 371 (c)(1),
(2), (4) Date: Nov. 26, 2001

(87) PCT Pub. No.: WO00/74045

PCT Pub. Date: Dec. 7, 2000

(30) Foreign Application Priority Data

May 31, 1999  (JP) ................................. 11-152469

(51) Int. Cl.
*G11B 7/00* (2006.01)
(52) U.S. Cl. ................. 369/59.11; 369/47.53; 369/116; 369/275.4
(58) Field of Classification Search ........... 369/59.11, 369/59.12, 116, 47.5, 47.51, 47.53, 100, 53.2, 369/275.4, 13.27, 53.26, 53.27

See application file for complete search history.

(56) References Cited

U.S. PATENT DOCUMENTS

| | | | |
|---|---|---|---|
| 5,003,527 A * | 3/1991 | Matsumoto et al. | 369/100 |
| 5,218,591 A * | 6/1993 | Shimamoto et al. | 369/59.11 |
| 5,572,502 A | 11/1996 | Naruse et al. | |
| 6,026,072 A * | 2/2000 | Taira et al. | 369/275.4 |
| 6,331,969 B1 | 12/2001 | Kobayashi et al. | |
| 6,388,985 B1 * | 5/2002 | Wu | 369/275.4 |
| 6,480,450 B1 * | 11/2002 | Fujii et al. | 369/59.12 |
| 6,515,952 B1 * | 2/2003 | Kikukawa et al. | 369/59.12 |
| 6,515,953 B1 * | 2/2003 | Miyamae et al. | 369/59.12 |
| 6,567,367 B2 * | 5/2003 | Ohno et al. | 369/116 |
| 2001/0036143 A1 | 11/2001 | Ohno et al. | |

FOREIGN PATENT DOCUMENTS

| | | |
|---|---|---|
| EP | 0 446 892 | 3/1991 |
| EP | 0 557 584 | 9/1993 |
| EP | 0 797 193 A1 | 9/1997 |
| EP | 1 059 632 | 12/2000 |

(Continued)

OTHER PUBLICATIONS

Ohta et al. "Overview and the Future of Phase-Change Optical Disk Technology" Japanese Journal of Applied Physics, vol. 39, No. 2B, pp. 770-774.

*Primary Examiner*—Thang V. Tran
(74) *Attorney, Agent, or Firm*—Hamre, Schumann, Mueller & Larson, P.C.

(57) ABSTRACT

An edge position of a recording pulse is corrected according to multi-valued information for determining the width of a mark in an edge position correction circuit, thereby it is possible to form a mark edge in a correct position when a mark with any width is to be corrected to enable a correct multi-valued recording/reproducing.

24 Claims, 7 Drawing Sheets

FOREIGN PATENT DOCUMENTS

| | | |
|---|---|---|
| JP | 1-154328 | 6/1989 |
| JP | 4-245025 | 9/1992 |
| JP | 4-366426 | 12/1992 |
| JP | 6-124450 | 5/1994 |
| JP | 7-272278 | 10/1995 |
| JP | 8-287465 | 11/1996 |
| JP | 8-329540 | 12/1996 |

* cited by examiner

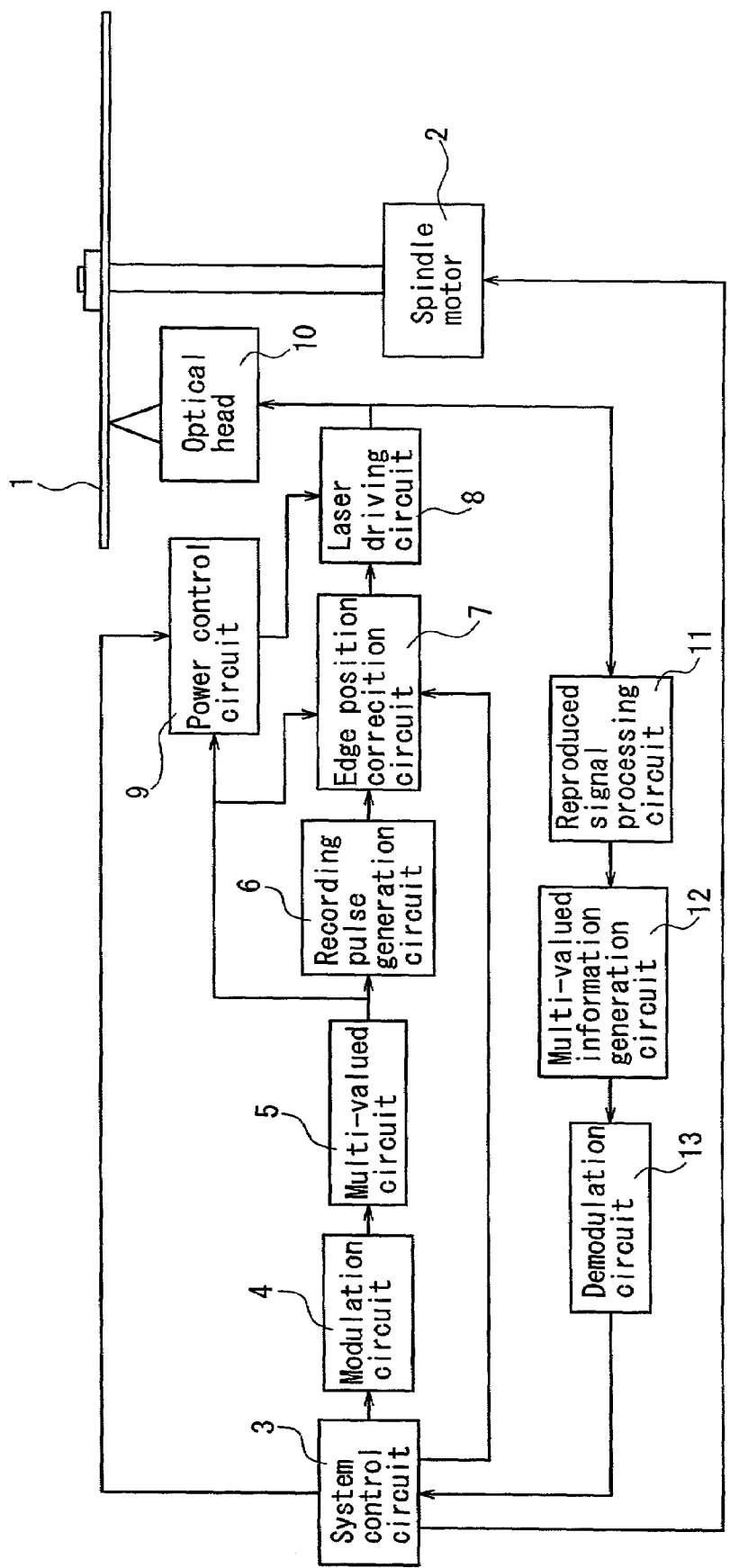
F I G. 1

OPTICAL INFORMATION RECORDING METHOD, OPTICAL INFORMATION RECORDING DEVICE AND OPTICAL INFORMATION RECORDING MEDIUM

TECHNICAL FIELD

The present invention relates to a method and apparatus for recording multi-valued information on an optical information recording medium that allows information to be recorded/reproduced optically, such as an optical disk.

BACKGROUND ART

In recent years, optical disks, optical cards, optical tapes, or the like have been proposed and under development as media for recording information optically. Of the above media, the optical disks have drawn attention, on which information can be recorded/reproduced with large capacity and high density.

One type of rewritable optical disks is a phase change optical disk. The phase change optical disk includes a recording film that is changed to be in the amorphous or crystalline state depending on thermal and cooling conditions by a laser beam. The amorphous and crystalline states can be reversed. The recording film has optical constants (refractive index and extinction coefficient) that differ in the amorphous and crystalline states. In the phase change optical disk, the two states are provided selectively on the recording film according to information signals so that the resultant optical change (a change in transmissivity or reflectivity) is used to record/reproduce the information signals.

To obtain the two states, information signals are recorded in the following manner. The recording film of an optical disk is irradiated with a laser beam in pulse form (with a power level of $P_1$) focused by an optical head. When the temperature of the recording film is raised to exceed the melting point, the molten portion is cooled rapidly with the passage of the laser beam to form an amorphous mark. The power level $P_1$ is called a recording power. For irradiation of the recording film with a focused laser beam (with a power level of $P_2$, $P_2<P_1$) having an intensity that increases the recording film temperature to temperatures ranging from the crystallization temperature to the melting point, the irradiated portion of the recording film is crystallized. The power level $P_2$ is called an erasing power.

In this manner, a recording pattern, including a mark of the amorphous area and a non-mark portion of the crystalline area (referred to as a space) that correspond to the information signals, is formed on a track of the optical disk. The information signal can be reproduced by utilizing a difference in the optical characteristics between the crystalline and amorphous areas.

Recently, a mark edge recording (also referred to as PWM recording) system is often used instead of a mark position recording (also referred to as PPM recording) system. In the mark position recording, information is represented by only the mark position itself. On the other hand, in the mark edge recording, it is represented by both the leading and trailing edges of a mark. Thus, the latter has the advantage of improving the recording linear density.

To achieve further improvement in the recording density, a multi-value recording method has been proposed, in which information of three or more values is recorded on a single mark. For example, JP 4 (1992)-209319 A discloses a method for recording multi-valued information by forming marks having different sizes with laser beam irradiation of at least three power levels.

However, the conventional multi-value recording method described above has a problem in that, particularly when used with the mark edge recording, information cannot be reproduced accurately due to an increase in the jitter of a reproduced signal. This is because the leading and trailing edges of an area in the mark where a width of the mark is constant and a space area where the width is zero (hereinafter, each of those areas is referred to as a unit recording area) are not formed at the precise positions.

For example, when a unit recording area with a large mark width is recorded according to multi-valued information, the recording power of a laser beam is increased, causing an increase in energy applied to a recording film. Since thermal diffusion in the recording film is isotropic substantially on the disk plane, the length of the unit recording area tends to be longer than a predetermined length. On the other hand, when a unit recording area with a small mark width is recorded, the recording power of the laser beam is reduced. Therefore, the length of the unit recording area tends to be shorter than a predetermined length. As a result, the leading and trailing edges of the unit recording area thus formed are shifted variously from the predetermined positions depending on the width thereof, which corresponds to a value of the multi-valued information. This prevents accurate reproduction of information that is represented by each edge of a unit recording area.

DISCLOSURE OF INVENTION

Therefore, with the foregoing in mind, it is an object of the present invention to provide a method and apparatus for recording optical information that can record multi-valued information with accuracy and high density by setting the leading and trailing edges of a recording pulse appropriately.

To achieve the above object, a first optical information recording method of the present invention includes irradiating an optical information recording medium with a laser beam to cause a change in the optical characteristics of a photosensitive recording film so that information is recorded as a mark. An area in the mark where a width of the mark is constant and a space area where the width is zero each are defined as a unit recording area. Information is represented by at least three different widths (i.e., three or more widths, including zero; the same is true in the following) of the unit recording areas. The unit recording area having a predetermined length and a predetermined width is formed by correcting the leading and trailing edge positions of a recording pulse for recording the unit recording area other than the space area in accordance with a width of the unit recording area to be recorded.

This method can set both the recording power and the pulse waveform of a laser beam according to the width of a unit recording area to be recorded. Therefore, even if the unit recording area has any width, its leading and trailing edges can be formed at predetermined positions, resulting in accurate recording/reproduction of information.

In the first optical information recording method, it is preferable that the unit recording area having a predetermined length and a predetermined width is formed by correcting the leading and trailing edge positions of the recording pulse in accordance with a combination of a width and a length of the unit recording area to be recorded.

Moreover, it is preferable that the unit recording area having a predetermined length and a predetermined width is formed by correcting the leading edge position of the recording pulse in accordance with a combination of a width of the unit recording area to be recorded, a length thereof and a length of the preceding unit recording area and by correcting the trailing edge position of the recording pulse in accordance with a combination of a width of the unit recording area to be recorded, a length thereof and a length of the next unit recording area.

These methods can set the waveform of a recording pulse according to the length of a unit recording area to be recorded as well as the lengths of the preceding and next unit recording areas, each having a different width. Therefore, the leading and trailing edges of the unit recording area can be formed more precisely at predetermined positions.

To achieve the above object, a second optical information recording method of the present invention includes irradiating an optical information recording medium with a laser beam to cause a change in the optical characteristics of a photosensitive recording film so that information is recorded as a mark. An area in the mark where a width of the mark is constant and a space area where the width is zero each are defined as a unit recording area. Information is represented by at least three different widths of the unit recording areas. The unit recording area having a predetermined length and a predetermined width is formed by correcting the leading edge position of a recording pulse for recording the unit recording area other than the space area in accordance with a combination of a width of the unit recording area to be recorded and a width of the preceding unit recording area and by correcting the trailing edge position of the recording pulse in accordance with a combination of a width of the unit recording area to be recorded and a width of the next unit recording area.

This method can set the edge positions of a recording pulse according to the width of a unit recording area to be recorded as well as the widths of the preceding and next unit recording areas. Therefore, even if any combination of widths is provided, the leading and trailing edges of the unit recording area can be formed at predetermined positions, resulting in more accurate recording/reproduction of information.

In the second optical information recording method, it is preferable that the unit recording area having a predetermined length and a predetermined width is formed by correcting the leading edge position of the recording pulse in accordance with a combination of a width of the unit recording area to be recorded, a width of the preceding unit recording area and a length of the unit recording area to be recorded and by correcting the trailing edge position of the recording pulse in accordance with a combination of a width of the unit recording area to be recorded, a width of the next unit recording area and a length of the unit recording area to be recorded.

Moreover, it is preferable that the unit recording area having a predetermined length and a predetermined width is formed by correcting the leading edge position of the recording pulse in accordance with a combination of a width of the unit recording area to be recorded, a width of the preceding unit recording area, a length of the unit recording area to be recorded and a length of the preceding unit recording area and by correcting the trailing edge position of the recording pulse in accordance with a combination of a width of the unit recording area to be recorded, a width of the next unit recording area, a length of the unit recording area to be recorded and a length of the next unit recording area.

These methods can set the edge positions of a recording pulse according to the length of a unit recording area to be recorded as well as the lengths of the preceding and next unit recording areas, each having a different width. Therefore, the leading and trailing edges of the unit recording area can be formed more precisely at predetermined positions.

In the first and second optical information recording methods, it is preferable that the amounts of correction of the leading and trailing edge positions of the recording pulse are determined by recording and reproducing a predetermined recording test pattern before recording the information.

This method can determine the optimum amount of correction for an optical information recording medium to be used in recording information. Therefore, even if the optical information recording medium has recording characteristic variations, information can be recorded accurately.

In the first and second optical information recording methods, it is preferable that a predetermined reproduction test pattern is recorded on the optical information recording medium so as to determine reproduction conditions of the information by reproducing the reproduction test pattern before reproducing the information.

This method can determine the optimum reproduction conditions for an optical information recording medium to be used in recording information. Therefore, information can be reproduced accurately even if the shapes of marks are varied due to the recording characteristic variations of the optical information recording medium.

The first and second optical information recording methods are suitable particularly for the case where information is further represented by the leading and trailing edges of the unit recording area as described above.

In the first and second optical information recording methods, it is preferable that the power of the laser beam is lowered to a bias level in the portion between a first recording pulse for recording a first unit recording area and a second recording pulse for recording a second unit recording area when the first and second unit recording areas, each having a different mark width other than zero, are recorded continuously as the unit recording areas.

Conventionally, the power level of a laser beam is changed simply according to the width of a mark to be formed without lowering to a bias level. The above method is one aspect of the present invention, in which a pulse is separated by temporarily lowering the level so that the edge positions are corrected precisely.

It is preferable that the first and second optical information recording methods further include selecting whether the information is represented by a width of the unit recording area in accordance with the type of information.

This method allows information to be represented by only edge positions or the like instead of a mark width, e.g., when the information to be recorded requires particularly low error rate. Therefore, the method can select recording with high recording density or low error rate according to information to be recorded, thus providing optimum recording based on the information.

The present invention also provides an optical information recording medium suitable for recording information with the above optical information recording methods.

A first optical information recording medium of the present invention includes a photosensitive recording film whose optical characteristics are changed by laser beam irradiation. An area where a width of a mark that is formed on the photosensitive recording film by the laser beam irradiation is constant and a space area where the width is zero each are defined as a unit recording area. An identifier for identifying whether information is represented by a width of the unit recording area is recorded previously on a predetermined area.

A recording/reproducing apparatus that uses this medium can recognize easily whether information recorded on the medium is represented by the width of a unit recording area by reproducing the identifier.

A second optical information recording medium of the present invention includes a photosensitive recording film whose optical characteristics are changed by laser beam irradiation. An area where a width of a mark that is formed on the photosensitive recording film by the laser beam irradiation is constant and a space area where the width is zero each are defined as a unit recording area. The amounts of correction of the leading and trailing edge positions of a recording pulse for recording the unit recording area other than the space area that are determined by a width of the unit recording area to be recorded are recorded previously on a predetermined area as information.

The use of this medium enables recording with the optimum amount of correction that has been recorded thereon. Thus, even if the optical information recording medium has recording characteristic variations, information can be recorded accurately without determining the amount of correction by recording/reproducing a test pattern.

To achieve the above object, a first optical information recording apparatus of the present invention is an apparatus for recording information on an optical information recording medium. The optical information recording medium is irradiated with a laser beam having a plurality of powers while switching the power of the laser beam to cause a change in the optical characteristics of a photosensitive recording film so that a mark is formed. An area in the mark where a width of the mark is constant and a space area where the width is zero each are defined as a unit recording area, and information is represented by at least three different widths of the unit recording areas. The apparatus includes a modulation means for modulating recording information to provide modulated information, a multi-valued means for converting the modulated information to multi-valued information, a recording pulse generation means for generating a recording pulse based on the multi-valued information, a recording power control means for controlling a recording power in accordance with a width of the unit recording area to be recorded that corresponds to the multi-valued information, an edge position correction means for correcting leading and trailing edge positions of the recording pulse in accordance with the width of the unit recording area to be recorded, and a recording means for recording the information on the optical information recording medium by irradiation of the laser beam based on the recording power and the corrected recording pulse.

This apparatus can set both the recording power and the pulse waveform of a laser beam according to the width of a unit recording area to be recorded. Therefore, even if the unit recording area has any width, its leading and trailing edges can be formed at predetermined positions, resulting in accurate recording/reproduction of information.

In the first optical information recording apparatus, it is preferable that the edge position correction means corrects the leading and trailing edge positions of the recording pulse in accordance with a combination of a width and a length of the unit recording area to be recorded.

Moreover, it is preferable that the edge position correction means corrects the leading edge position of the recording pulse in accordance with a combination of a width of the unit recording area to be recorded, a length thereof and a length of the preceding unit recording area and the trailing edge position of the recording pulse in accordance with a combination of a width of the unit recording area to be recorded, a length thereof and a length of the next unit recording area.

These apparatuses can set the waveform of a recording pulse according to the length of a unit recording area to be recorded as well as the lengths of the preceding and next unit recording areas, each having a different width. Therefore, the leading and trailing edges of the unit recording area can be formed more precisely at predetermined positions.

To achieve the above object, a second optical information recording apparatus of the present invention is an apparatus for recording information on an optical information recording medium. The optical information recording medium is irradiates with a laser beam having a plurality of powers while switching the power of the laser beam to cause a change in the optical characteristics of a photosensitive recording film so that a mark is formed. An area in the mark where a width of the mark is constant and a space area where the width is zero each are defined as a unit recording area, and information is represented by at least three different widths of the unit recording areas. The apparatus includes a modulation means for modulating recording information to provide modulated information, a multi-valued means for converting the modulated information to multi-valued information, a recording pulse generation means for generating a recording pulse based on the multi-valued information, a recording power control means for controlling a recording power in accordance with a width of the unit recording area to be recorded that corresponds to the multi-valued information, an edge position correction means for correcting the leading edge position of the recording pulse in accordance with a combination of a width of the unit recording area to be recorded and a width of the preceding unit recording area and for correcting the trailing edge position of the recording pulse in accordance with a combination of a width of the unit recording area to be recorded and a width of the next unit recording area, and a recording means for recording the information on the optical information recording medium by irradiation of the laser beam based on the recording power and the corrected recording pulse.

This apparatus can set both the recording power and the pulse waveform of a laser beam according to the width of a unit recording area to be recorded as well as the widths of the preceding and next unit recording areas. Therefore, even if the unit recording area has any width, its leading and trailing edges can be formed at predetermined positions, resulting in accurate recording/reproduction of information.

In the second optical information recording apparatus, it is preferable that the edge position correction means corrects the leading edge position of the recording pulse in accordance with a combination of a width of the unit recording area to be recorded, a width of the preceding unit recording area and a length of the unit recording area to be recorded, and the trailing edge position of the recording pulse in accordance with a combination of a width of the unit recording area to be recorded, a width of the next unit recording area and a length of the unit recording area to be recorded.

Moreover, it is preferable that the edge position correction means corrects the leading edge position of the recording pulse in accordance with a combination of a width of the unit recording area to be recorded, a width of the preceding unit recording area, a length of the unit recording area to be recorded and a length of the preceding unit recording area, and the trailing edge position of the recording pulse in accordance with a combination of a width of the recording unit area to be recorded, a width of the next unit recording area, a length of the unit recording area to be recorded and a length of the next unit recording area.

These apparatuses can set the edge positions of a recording pulse according to the length of a unit recording area to be recorded as well as the lengths of the preceding and next unit recording areas, each having a different width. Therefore, the leading and trailing edges of the unit recording area can be formed more precisely at predetermined positions.

BRIEF DESCRIPTION OF DRAWINGS

FIG. 1 is a block diagram showing the configuration of an embodiment of a recording apparatus of the present invention.

FIG. 2(a) illustrates four-valued information;

FIG. 2(b) is a waveform diagram of a recording pulse;

FIG. 2(c) is a waveform diagram of a corrected recording pulse to be input to a laser driving circuit;

FIG. 2(d) is a waveform diagram illustrating a change in the emission power of a laser beam; and FIG. 2(e) illustrates the recorded state of marks on a track.

FIG. 3(a) illustrates the recorded state of marks on a track;

FIG. 3(b) is a waveform diagram of a reproduced signal;

FIG. 3(c) is a waveform diagram of a four-valued signal; and

FIG. 3(d) shows four-valued information.

FIG. 4(a) illustrates four-valued information;

FIG. 4(b) is a waveform diagram of a recording pulse;

FIG. 4(c) is a waveform diagram of a recording pulse to be input to a laser driving circuit;

FIG. 4(d) is a waveform diagram illustrating a change in the emission power of a laser beam.

FIG. 5(a) illustrates four-valued information;

FIG. 5(b) is a waveform diagram of a recording pulse;

FIG. 5(c) is a waveform diagram of a corrected recording pulse to be input to a laser driving circuit;

FIG. 5(d) is a waveform diagram illustrating a change in the emission power of a laser beam; and FIG. 5(e) illustrates the recorded state of marks on a track.

FIG. 6(a) illustrates four-valued information;

FIG. 6(b) is a waveform diagram of a recording pulse;

FIG. 6(c) is a waveform diagram of a corrected recording pulse to be input to a laser driving circuit;

FIG. 6(d) is a waveform diagram illustrating a change in the emission power of a laser beam; and FIG. 6(e) illustrates the recorded state of marks on a track.

DETAILED DESCRIPTION OF THE INVENTION

Figure 2:
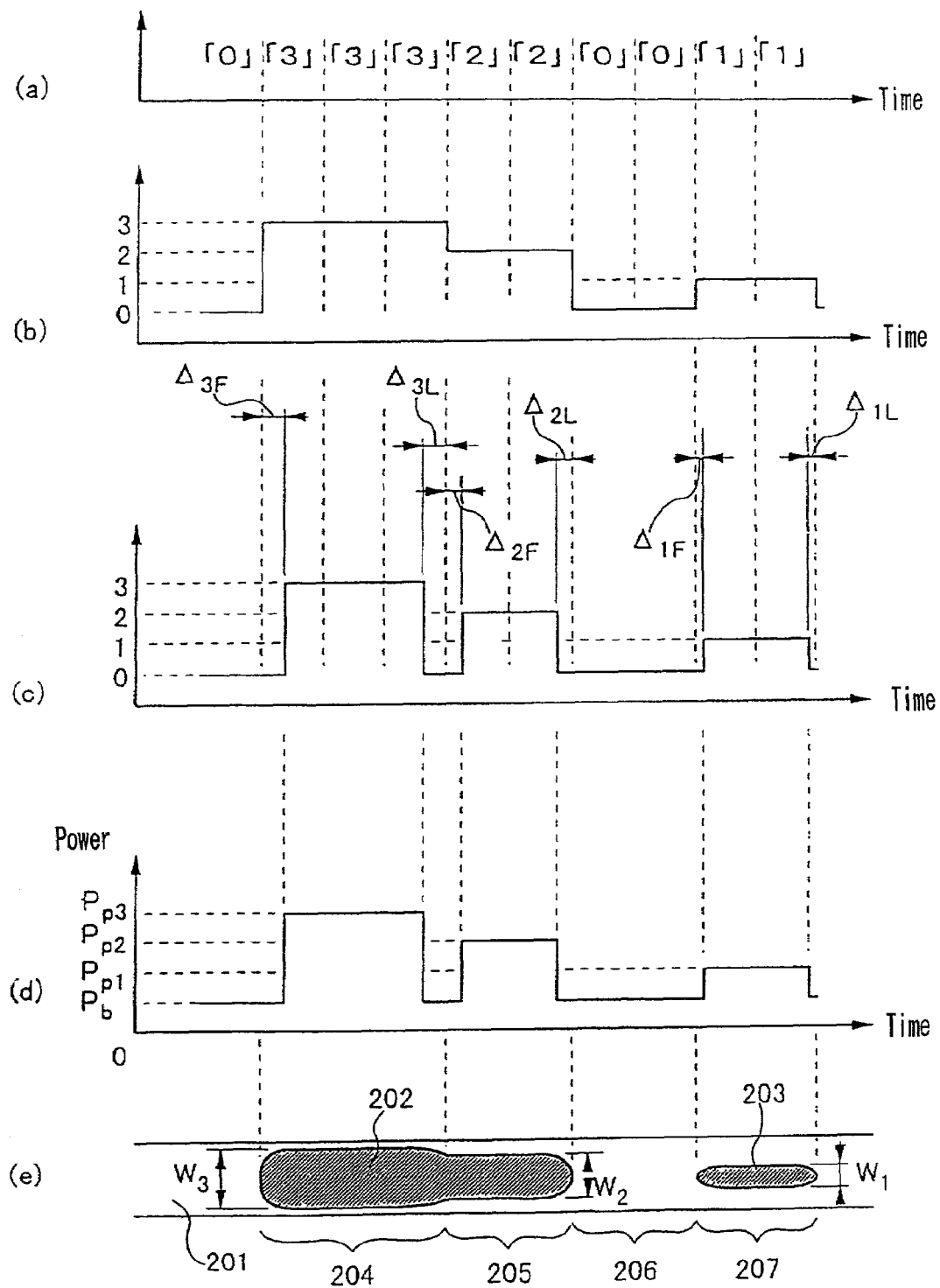
FIGS. 2(a) to 2(e) are signal waveform diagrams and a track state diagram that illustrate a recording operation of an embodiment of a recording method of the present invention.

Hereinafter, embodiments of the present invention will be described with reference to the accompanying drawings.

FIG. 1 is a block diagram showing the schematic configuration of a recording/reproducing apparatus (optical information recording apparatus) of an embodiment of the present invention.

The recording/reproducing apparatus of this embodiment uses an optical disk 1 to record/reproduce information. Examples of the optical disk 1 include a phase change optical disk, a magneto-optical disk, and a disk employing dye as a recording layer. Alternatively, the master of a stamper with a photoresist coating for producing a read-only disk may be used.

The recording/reproducing apparatus includes a spindle motor 2 and an optical head 10: the spindle motor 2 rotates the optical disk 1; the optical head 10 includes a laser source (not shown) and focuses a laser beam on the desired portion of the optical disk 1. The whole operation of the recording/reproducing apparatus is controlled by a system control circuit 3.

The recording/reproducing apparatus includes a modulation circuit 4, a multi-valued circuit 5, a recording pulse generation circuit 6, and an edge position correction circuit 7 as a recording means. The modulation circuit 4 modulates recording information according to a predetermined modulation rule to provide modulated information. The multi-valued circuit 5 generates multi-valued information according to the modulated information. The recording pulse generation circuit 6 generates a recording pulse according to the multi-valued information. The edge position correction circuit 7 corrects the edge positions of the recording pulse. The recording/reproducing apparatus further includes a power control circuit 9 that sets the power of the laser beam based on the multi-valued information. Moreover, it is provided with a laser driving circuit 8 that modulates the current for driving the laser source in the optical head 10 according to a recording pulse output from the edge position correction circuit 7 and a control signal from the power control circuit 9.

The recording/reproducing apparatus includes a reproduced signal processing circuit 11, a multi-valued information generation circuit 12, and a demodulation circuit 13 as a reproduction means for reproducing information from the optical disk 1. The reproduced signal processing circuit 11 performs waveform processing (such as equalizing) of a reproduced signal based on the reflected light from the optical disk 1. The multi-valued information generation circuit 12 generates four-valued information from the reproduced signal. The demodulation circuit 13 demodulates reproduced information from the multi-valued information.

Figure 3:
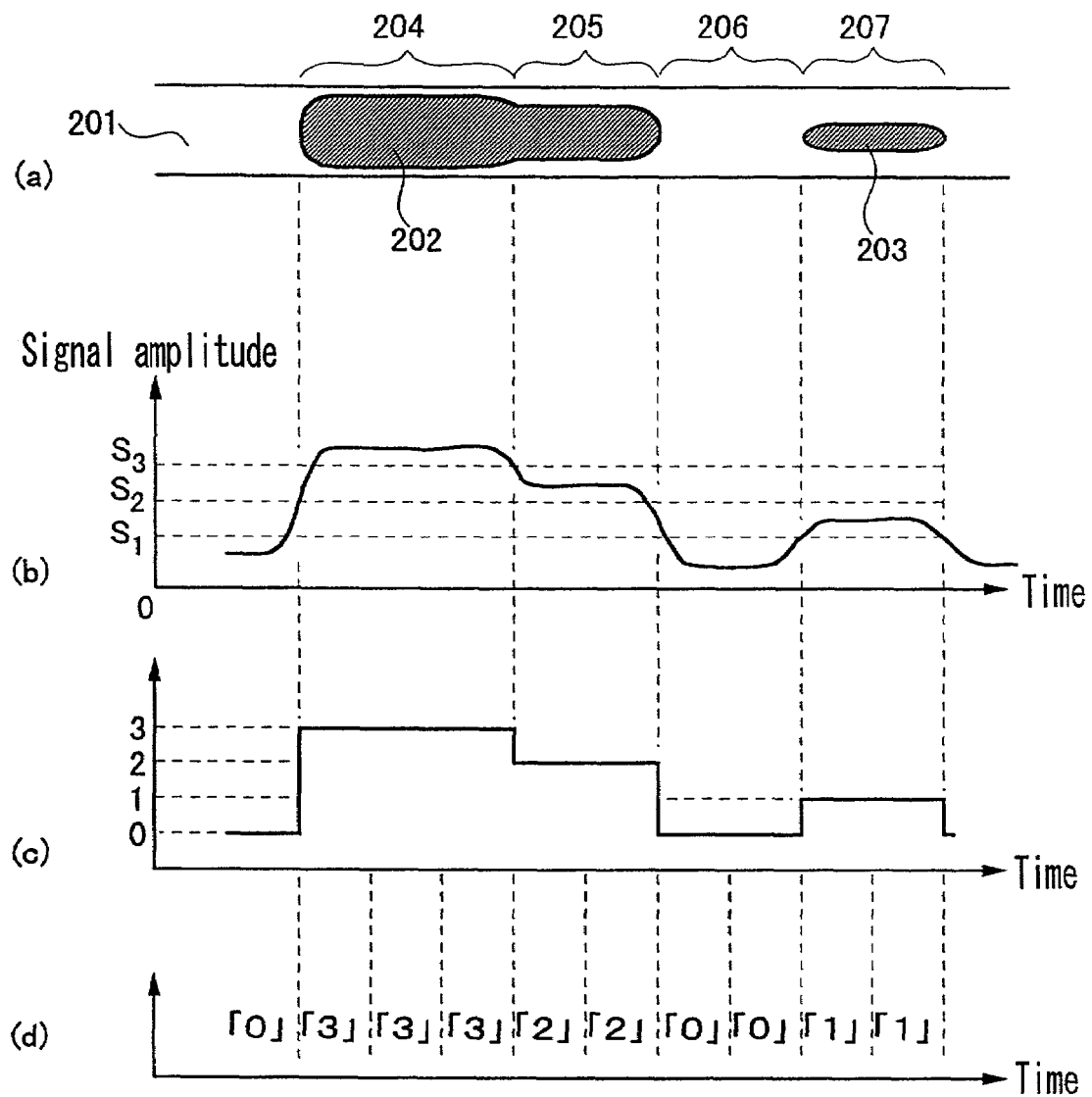
FIGS. 3(a) to 3(d) are a track state diagram and signal waveform diagrams that illustrate an example of operation for reproducing information recorded according to the present invention.

Next, the operation of the recording/reproducing apparatus of this embodiment will be described with reference to signal waveform diagrams and track state diagrams in FIGS. 2 and 3. FIG. 2 corresponds to the operation for recording four-valued information, and FIG. 3 corresponds to the operation for reproducing four-valued information.

For recording, first, the system control circuit 3 rotates the spindle motor 2 so that the optical head 10 seeks a predetermined track on the optical disk 1, and thus the system control circuit 3 determines a set value of recording power in the power control circuit 9. Then, the system control circuit 3 generates recording information based on data from a host processor and sends it to the modulation circuit 4. The modulation circuit 4 transmits modulated information to the multi-valued circuit 5. The multi-valued circuit 5 outputs four-valued information as shown in FIG. 2(a) to each of the recording pulse generation circuit 6, the edge position correction circuit 7, and the power control circuit 9.

The recording pulse generation circuit 6 generates a recording pulse as shown in FIG. 2(b) based on the four-valued information. The recording pulse may be produced with two-bit signals (i.e., two binary information signals).

The recording pulse generation circuit 6 transmits the recording pulse to the edge position correction circuit 7. According to the four-valued information from the multi-valued circuit 5, the edge position correction circuit 7 corrects the waveform of the recording pulse transmitted from the recording pulse generation circuit as shown in FIG. 2(c). The amount of correction ($\Delta_{1F}, \Delta_{1L}, \Delta_{2F}, \Delta_{2L}, \Delta_{3F}, \Delta_{3L}$) is registered on a memory within the edge position correction circuit 7 as information shown in Tables 1 and 2. The recording pulse waveform is corrected by referring to the memory. For example, when the four-valued information is "3", the leading edge of the recording pulse is delayed by $\Delta_{3F}$ and the trailing edge is advanced by $\Delta_{3L}$. When the four-valued information is "2" or "1", both edges are corrected in the same manner, respectively. When the four-valued information is "0", it corresponds to a space (i.e., a non-mark portion) in this embodiment, where no recording pulse is present that requires edge correction. Therefore, the recording pulse is not corrected.

TABLE 1

| Four-valued information | Amount of correction of a leading edge |
|---|---|
| "0" | — |
| "1" | $\Delta_{1F}$ |
| "2" | $\Delta_{2F}$ |
| "3" | $\Delta_{3F}$ |

TABLE 2

| Four-valued information | Amount of correction of a trailing edge |
|---|---|
| "0" | — |
| "1" | $\Delta_{1L}$ |
| "2" | $\Delta_{2L}$ |
| "3" | $\Delta_{3L}$ |

The power control circuit 9 determines a recording power of a laser beam based on the four-valued information. In this embodiment, the four-valued information is related to the recording power, as shown in Table 3.

Figure 7:
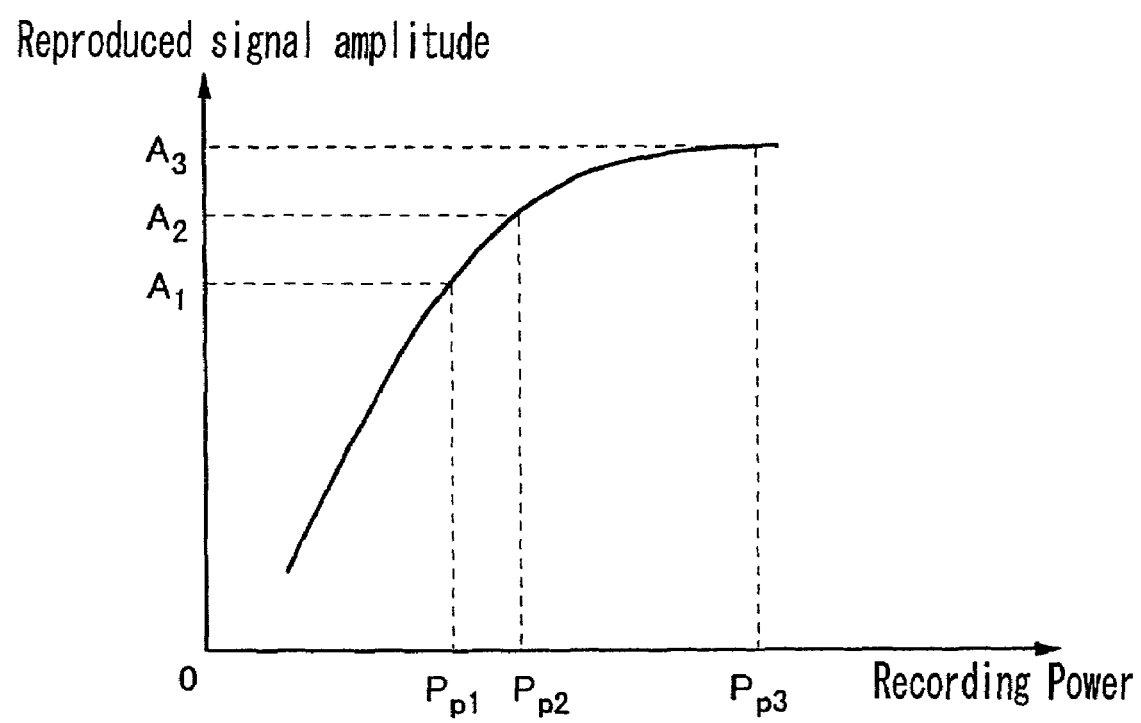
FIG. 7 shows the relationship between the recording power and the reproduced signal amplitude of an optical disk.

For example, when information is recorded on a phase change optical disk with the same recording pulse width, the relationship between the recording power and the reproduced signal amplitude is such as to be shown in FIG. 7, and the width of a mark is increased with increasing reproduced signal amplitude. Therefore, the recording powers $P_{p1}, P_{p2}$, and $P_{p3}$ can be selected so as to differ in reproduced signal amplitude, as indicated by the three points of $A_1, A_2,$ and $A_3$ in FIG. 7.

The laser driving circuit modulates the current for driving the laser based on a control signal from the power control circuit 9 and the recording pulse whose edge positions have been corrected. Consequently, the laser beam emitted has a waveform as shown in FIG. 2(d).

TABLE 3

| Four-valued information | Recording power |
|---|---|
| "0" | — |
| "1" | $P_{p1}$ |
| "2" | $P_{p2}$ |
| "3" | $P_{p3}$ |

The optical head 10 performs a recording operation on a predetermined track. Thus, as shown in FIG. 2(e), recording marks 202, 203 and unit recording areas 204, 205, 206, and 207, each having a predetermined length based on the four-valued information, are formed on a track 201. Since the width of a unit recording area is determined by a recording power, each of the unit recording areas has a predetermined width based on the four-valued information (i.e., the mark areas with widths of $W_1, W_2,$ and $W_3$ and the space area with zero width).

For reproduction, the track 201, on which the unit recording areas 204, 205, 206, and 207 are formed as shown in FIG. 3(a), is irradiated with reproduction power by the laser in the optical head 10. Then, a photodetector in the optical head 10 receives the reflected light and converts it to an electric signal. FIG. 3(b) shows the waveform of the reproduced signal thus converted, indicating that the signal of levels corresponding to the widths of the unit recording areas is reproduced. The reproduced signal processing circuit 11 equalizes the reproduced signal waveform and slices the signal levels, so that the reproduced signal is converted to a four-valued signal (see FIG. 3(c)). This embodiment employs three slice levels (i.e., $S_1, S_2,$ and $S_3$ in FIG. 3(b)) to detect the levels of four values. The multi-valued information generation circuit 12 generates four-valued information as shown in FIG. 3(d), and the demodulation circuit 13 demodulates reproduced information.

As described above, the reason why the leading and trailing edges of a recording pulse are corrected according to the width of a unit recording area to be recorded is that the length of the unit recording area is shifted variously from a predetermined length to be recorded when the unit recording areas with different widths are recorded.

Generally, a higher recording power is necessary to record the unit recording area having a large width. Increased recording power causes an increase in energy to be applied to the recording film. Therefore, the length of the unit recording area tends to be longer than a predetermined length. This phenomenon will be described below by illustrating a conventional example.

FIGS. 4(a) to 4(e) show signal waveforms and the state of marks recorded on a track in a conventional multi-value recording method and correspond to FIGS. 2(a) to 2(e) of this embodiment, respectively.

Figure 4:
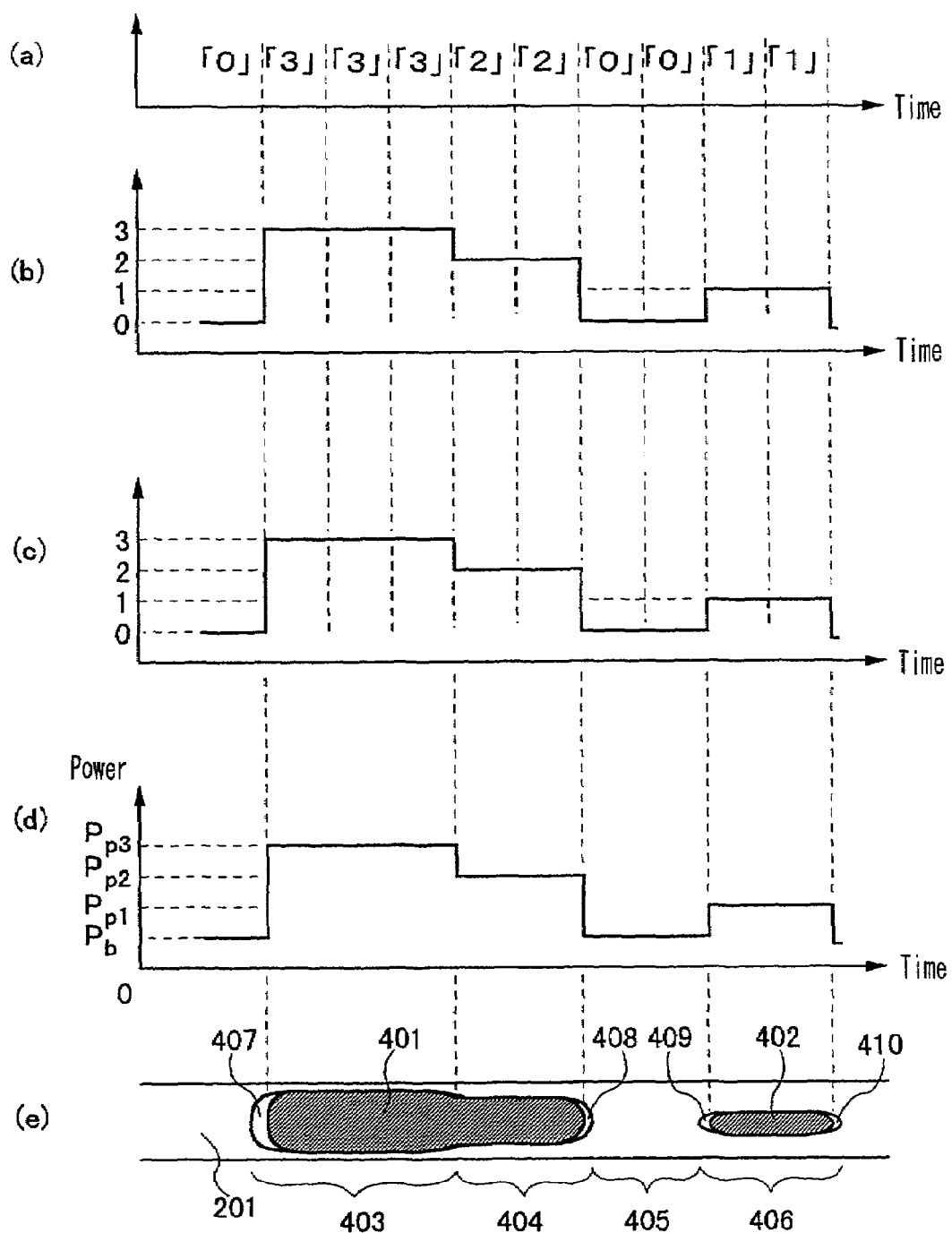
FIGS. 4(a) to 4(d) are signal waveform diagrams and a track state diagram that illustrate a conventional recording method.
FIG. 4(e) illustrates the recorded state of marks on a track.

In the conventional multi-value recording method, when four-valued information as shown in FIG. 4(a) is recorded, a recording pulse (FIG. 4(b)) is not corrected by the four-valued information. Therefore, the laser beam emitted has a waveform as shown in FIG. 4(d) and produces a recording power $P_{p3}$ for the four-valued information of "3", resulting in large energy application to the recording film of an optical disk. Thus, the length of each recording mark 401, 402 becomes longer than a predetermined length, as shown in FIG. 4(e). Specifically, elongations 407 and 408 appear at the leading edge of a unit recording area 403 and the trailing edge of a unit recording area 404, respectively; also, elongations 409 and 410 appear at both edges of a unit recording area 406 that is separated by a unit recording area (space area) 405.

Similarly, the leading and trailing edges elongate when the four-valued information is "2". However, since the recording power $P_{p2}$ is lower than $P_{p3}$, the tendency to elongation is reduced, compared with the four-valued information of "3". When the four-valued information is "1", the leading and trailing edges elongate as well. However, the tendency is smaller than that for the four-valued information of "2" for the same reason.

As described above, the tendency of a unit recording area to elongate differs depending on four-valued information (i.e., the width of a unit recording area to be recorded). This leads to the deviation of a reproduced signal from a predetermined timing during reproduction, which in turn causes various timing deviations of the four-valued signal that is converted from the reproduced signal. Consequently, jitter is increased, making accurate reproduction of information impossible.

On the other hand, this embodiment corrects the leading and trailing edges of a recording pulse so that the unit recording having a predetermined length can be recorded. The amount of correction of each edge is set so as to record the unit recording area with a predetermined length. Since high power recording generally tends to increase the length of a unit recording area, the amount of correction of a recording pulse for high power recording is larger than that for low power recording.

As described above, this embodiment corrects the leading and trailing edges of a recording pulse according to the width of a unit recording area to be recorded (i.e., four-valued information). Thus, even if the unit recording area has any width, its edges can be formed at the precise positions. Therefore, this embodiment has a special effect of recording and reproducing multi-valued information accurately.

Also, this embodiment performs the above correction in the following manner: when the unit recording areas 204 and 205, each having a different mark width other than zero, are recorded continuously as shown in FIG. 2, the power of a laser beam is lowered to a bias level of $P_b$ in the portion between a recording pulse for recording the unit recording area 204 and that for the unit recording area 205.

In this embodiment, the waveform of a recording pulse is corrected according to the width of a unit recording area to be recorded. It is preferred to correct the recording pulse waveform as follows.

The first method is such that the recording pulse waveform is corrected according to the length of a unit recording area to be recorded, in addition to the width thereof. Generally, the length of a unit recording area tends to be longer than a predetermined length because the amount of heat accumulated increases with irradiation time even under the same recording power. Thus, the correction according to not only the width but also the length of a unit recording area enables more precise formation of the edges.

The second method is such that the leading and trailing edge positions of a recording pulse are corrected respectively by combining the width of a unit recording area to be recorded with both a width of the preceding unit recording area and a width of the next unit recording area. Considering the mutual influence of the adjacent unit recording areas enables more precise formation of the edges. Here, the second method will be described.

Figure 5:
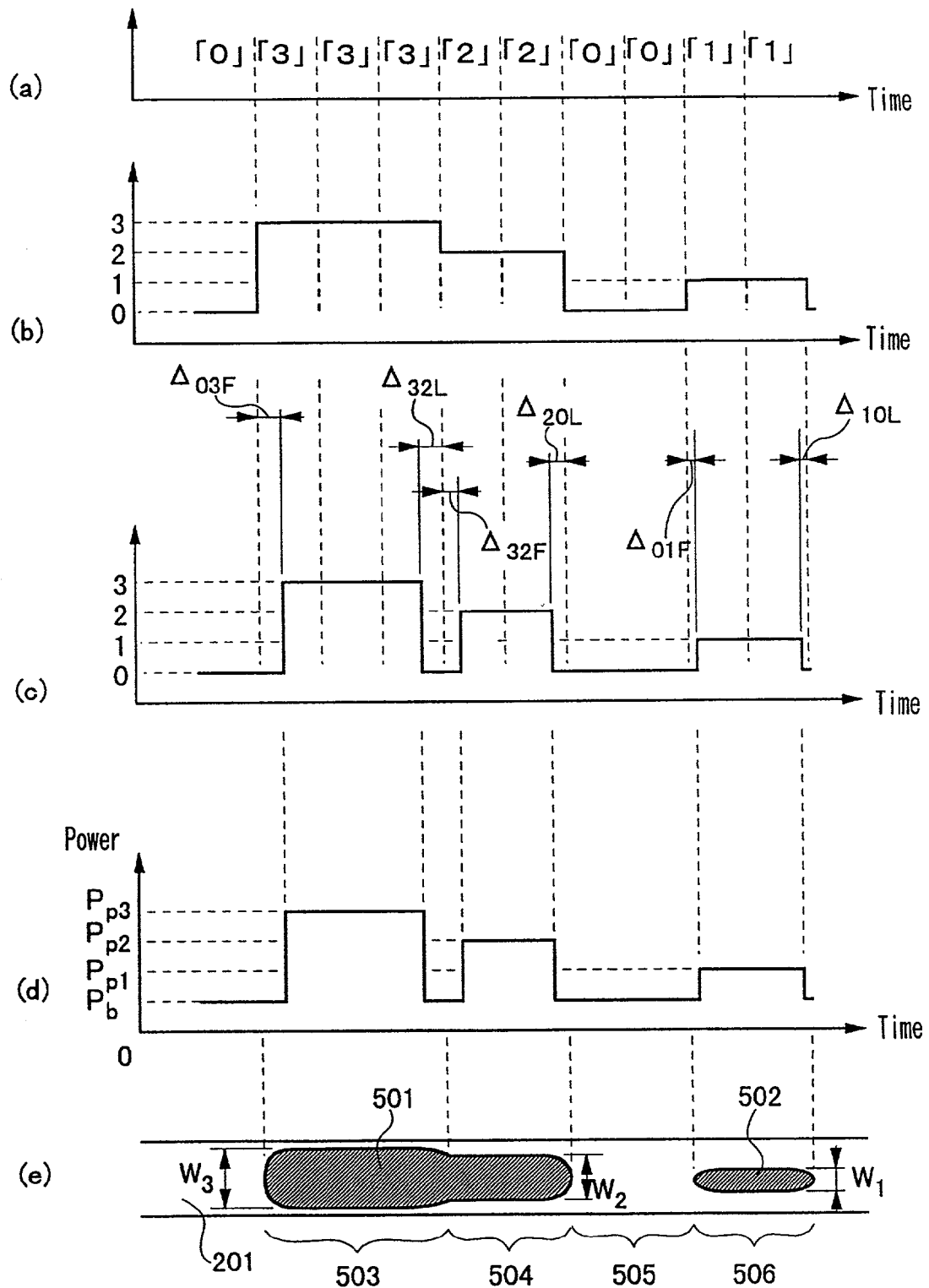
FIGS. 5(a) to 5(e) are signal waveform diagrams and a track state diagram that illustrate a recording operation of another embodiment of a recording method of the present invention.

The amount of correction in this case is registered on a memory within the edge position correction circuit 7 in FIG. 1 as information shown in Tables 4 and 5. The leading and trailing edges of a recording pulse are corrected by referring to the memory. The same correction is made when the second information has different combinations. FIGS. 5(a) to 5(e) show signal waveforms and the state of marks recorded on a track in a multi-value recording method of this embodiment and correspond to FIGS. 2(a) to 2(e), respectively. In FIG. 5, e.g., when four-valued information to be recorded is "3" and the preceding information is "0", the leading edge of a recording pulse is delayed by $\Delta_{03F}$. When the four-valued information to be recorded is "3" and the next information is "2", the trailing edge is advanced by $\Delta_{32L}$.

In this manner, recording marks 501 and 502, each having a predetermined length, are formed on a track 201, which enables precise formation of unit recording areas 503 (with a width of $W_3$), 504 (with a width of $W_2$), 505 (with zero width) and 506 (with a width of $W_1$).

TABLE 4

Amount of correction of a leading edge

|  |  | Four-valued information | | | |
|---|---|---|---|---|---|
|  |  | "0" | "1" | "2" | "3" |
| The preceding four-valued information | "0" | — | $\Delta_{01F}$ | $\Delta_{02F}$ | $\Delta_{03F}$ |
|  | "1" | — | $\Delta_{11F}$ | $\Delta_{12F}$ | $\Delta_{13F}$ |
|  | "2" | — | $\Delta_{21F}$ | $\Delta_{22F}$ | $\Delta_{23F}$ |
|  | "3" | — | $\Delta_{31F}$ | $\Delta_{32F}$ | $\Delta_{33F}$ |

TABLE 5

Amount of correction of a trailing edge

|  |  | Four-valued information | | | |
|---|---|---|---|---|---|
|  |  | "0" | "1" | "2" | "3" |
| The next four-valued information | "0" | — | $\Delta_{10L}$ | $\Delta_{20L}$ | $\Delta_{30L}$ |
|  | "1" | — | $\Delta_{11L}$ | $\Delta_{21L}$ | $\Delta_{31L}$ |
|  | "2" | — | $\Delta_{12L}$ | $\Delta_{22L}$ | $\Delta_{32L}$ |
|  | "3" | — | $\Delta_{13L}$ | $\Delta_{23L}$ | $\Delta_{33L}$ |

The above operation can correct the variation in thermal interference resulting from various differences in widths of the preceding and next unit recording areas. Therefore, the unit recording area can be recorded at more precise edge positions. In this case, the amount of correction is increased with increasing width of a unit recording area to be recorded (e.g., $\Delta_{01F} < \Delta_{02F} < \Delta_{03F}$ holds in the first row of Table 4).

Moreover, it is preferred to use the above method with the following method: the leading and trailing edges of a recording pulse are corrected according to the length of a unit recording area as well as the lengths of the preceding and next unit recording areas. The amount of correction in this case is registered on a memory within the edge position correction circuit 7 in FIG. 1 as information shown in Tables 6 and 7. The leading and trailing edges of a recording pulse are corrected by referring to the memory. The same correction is made when the second information has different combinations. Tables 6 and 7 show a modulation system in which the length of a unit recording area can range from 2T to 7T (T indicates a clock cycle).

TABLE 6

| | | | | | Amount of correction of a leading edge | | | | | | |
|---|---|---|---|---|---|---|---|---|---|---|---|
| | | | | | Length of a unit recording area | | | | | | |
| | | | | 2T | | | | 3T | | | ... |
| | | | | Four valued information | | | | Four valued information | | | ... |
| | | | | "0" | "1" | "2" | "3" | "0" | "1" | "2" | "3" |
| Length of the preceding unit recording area | 2T | The preceding four valued information | "0" | — | $\Delta_{2201F}$ | $\Delta_{2202F}$ | $\Delta_{2203F}$ | The preceding four valued information "0" | — | $\Delta_{2301F}$ | $\Delta_{2302F}$ | $\Delta_{2303F}$ ... |
| | | | "1" | — | $\Delta_{2211F}$ | $\Delta_{2212F}$ | $\Delta_{2213F}$ | "1" — | $\Delta_{2311F}$ | $\Delta_{2312F}$ | $\Delta_{2313F}$ |
| | | | "2" | — | $\Delta_{2221F}$ | $\Delta_{2222F}$ | $\Delta_{2223F}$ | "2" — | $\Delta_{2321F}$ | $\Delta_{2322F}$ | $\Delta_{2323F}$ |
| | | | "3" | — | $\Delta_{2231F}$ | $\Delta_{2232F}$ | $\Delta_{2233F}$ | "3" — | $\Delta_{2331F}$ | $\Delta_{2332F}$ | $\Delta_{2333F}$ |
| | | | | Four valued information | | | | Four valued information | | | ... |
| | | | | "0" | "1" | "2" | "3" | "0" | "1" | "2" | "3" |
| | 3T | The preceding four valued information | "0" | — | $\Delta_{3201F}$ | $\Delta_{3202F}$ | $\Delta_{3203F}$ | The preceding four valued information "0" — | $\Delta_{3301F}$ | $\Delta_{3302F}$ | $\Delta_{3303F}$ ... |
| | | | "1" | — | $\Delta_{3211F}$ | $\Delta_{3212F}$ | $\Delta_{3213F}$ | "1" — | $\Delta_{3311F}$ | $\Delta_{3312F}$ | $\Delta_{3313F}$ |
| | | | "2" | — | $\Delta_{3221F}$ | $\Delta_{3222F}$ | $\Delta_{3223F}$ | "2" — | $\Delta_{3321F}$ | $\Delta_{3322F}$ | $\Delta_{3323F}$ |
| | | | "3" | — | $\Delta_{3231F}$ | $\Delta_{3232F}$ | $\Delta_{3233F}$ | "3" — | $\Delta_{3331F}$ | $\Delta_{3332F}$ | $\Delta_{3333F}$ |
| ... | | ... | | ... | | | | ... | | | ... |
| | | | | Four valued information | | | | Four valued information | | | ... |
| | | | | "0" | "1" | "2" | "3" | "0" | "1" | "2" | "3" |
| | 7T | The preceding four valued information | "0" | — | $\Delta_{7201F}$ | $\Delta_{7202F}$ | $\Delta_{7203F}$ | The preceding four valued information "0" — | $\Delta_{7301F}$ | $\Delta_{7302F}$ | $\Delta_{7303F}$ ... |
| | | | "1" | — | $\Delta_{7211F}$ | $\Delta_{7212F}$ | $\Delta_{7213F}$ | "1" — | $\Delta_{7311F}$ | $\Delta_{7312F}$ | $\Delta_{7313F}$ |
| | | | "2" | — | $\Delta_{7221F}$ | $\Delta_{7222F}$ | $\Delta_{7223F}$ | "2" — | $\Delta_{7321F}$ | $\Delta_{7322F}$ | $\Delta_{7323F}$ |
| | | | "3" | — | $\Delta_{7231F}$ | $\Delta_{7232F}$ | $\Delta_{7233F}$ | "3" — | $\Delta_{7331F}$ | $\Delta_{7332F}$ | $\Delta_{7333F}$ |

| | | | Amount of correction of a leading edge | | | |
|---|---|---|---|---|---|---|
| | | | Length of a unit recording area | | | |
| | | ... | 7T | | | |
| | | | Four valued information | | | |
| | | ... | "0" | "1" | "2" | "3" |
| Length of the preceding unit recording area | 2T ... | The preceding four valued information "0" — | | $\Delta_{2701F}$ | $\Delta_{2702F}$ | $\Delta_{2703F}$ |
| | | "1" — | | $\Delta_{2711F}$ | $\Delta_{2712F}$ | $\Delta_{2713F}$ |
| | | "2" — | | $\Delta_{2721F}$ | $\Delta_{2722F}$ | $\Delta_{2723F}$ |
| | | "3" — | | $\Delta_{2731F}$ | $\Delta_{2732F}$ | $\Delta_{2733F}$ |
| | | | Four valued information | | | |
| | | ... | "0" | "1" | "2" | "3" |
| | 3T ... | The preceding four valued information "0" — | | $\Delta_{3701F}$ | $\Delta_{3702F}$ | $\Delta_{3703F}$ |
| | | "1" — | | $\Delta_{3711F}$ | $\Delta_{3712F}$ | $\Delta_{3713F}$ |
| | | "2" — | | $\Delta_{3721F}$ | $\Delta_{3722F}$ | $\Delta_{3723F}$ |
| | | "3" — | | $\Delta_{3731F}$ | $\Delta_{3732F}$ | $\Delta_{3733F}$ |
| | ... ... | ... | | ... | | ... |
| | | | Four valued information | | | |
| | | ... | "0" | "1" | "2" | "3" |
| | 7T ... | The preceding four valued information "0" — | | $\Delta_{7701F}$ | $\Delta_{7702F}$ | $\Delta_{7703F}$ |
| | | "1" — | | $\Delta_{7711F}$ | $\Delta_{7712F}$ | $\Delta_{7713F}$ |
| | | "2" — | | $\Delta_{7721F}$ | $\Delta_{7722F}$ | $\Delta_{7723F}$ |
| | | "3" — | | $\Delta_{7731F}$ | $\Delta_{7732F}$ | $\Delta_{7733F}$ |

TABLE 7

| | | | | | Amount of correction of a leading edge | | | | | | | |
|---|---|---|---|---|---|---|---|---|---|---|---|---|
| | | | | | Length of a unit recording area | | | | | | | |
| | | | | | 2T | | | | 3T | | | ... |
| | | | | | Four valued information | | | | Four valued information | | | ... |
| | | | | "0" | "1" | "2" | "3" | "0" | "1" | "2" | "3" | |
| Length of the next unit recording area | 2T | The next four valued information | "0" "1" "2" "3" | — — — — | $\Delta_{2201L}$ $\Delta_{2211L}$ $\Delta_{2221L}$ $\Delta_{2231L}$ | $\Delta_{2202L}$ $\Delta_{2212L}$ $\Delta_{2222L}$ $\Delta_{2232L}$ | $\Delta_{2203L}$ $\Delta_{2213L}$ $\Delta_{2223L}$ $\Delta_{2233L}$ | The next four valued information "0" "1" "2" "3" — — — — | $\Delta_{2301L}$ $\Delta_{2311L}$ $\Delta_{2321L}$ $\Delta_{2331L}$ | $\Delta_{2302L}$ $\Delta_{2312L}$ $\Delta_{2322L}$ $\Delta_{2332L}$ | $\Delta_{2303L}$ $\Delta_{2313L}$ $\Delta_{2323L}$ $\Delta_{2333L}$ | ... |
| | | | | | Four valued information | | | | Four valued information | | | ... |
| | | | | "0" | "1" | "2" | "3" | "0" | "1" | "2" | "3" | |
| | 3T | The next four valued information | "0" "1" "2" "3" | — — — — | $\Delta_{3201L}$ $\Delta_{3211L}$ $\Delta_{3221L}$ $\Delta_{3231L}$ | $\Delta_{3202L}$ $\Delta_{3212L}$ $\Delta_{3222L}$ $\Delta_{3232L}$ | $\Delta_{3203L}$ $\Delta_{3213L}$ $\Delta_{3223L}$ $\Delta_{3233L}$ | The next four valued information "0" "1" "2" "3" — — — — | $\Delta_{3301L}$ $\Delta_{3311L}$ $\Delta_{3321L}$ $\Delta_{3331L}$ | $\Delta_{3302L}$ $\Delta_{3312L}$ $\Delta_{3322L}$ $\Delta_{3332L}$ | $\Delta_{3303L}$ $\Delta_{3313L}$ $\Delta_{3323L}$ $\Delta_{3333L}$ | ... |
| ... | | ... | | | ... | | | | ... | | | ... |
| | | | | | Four valued information | | | | Four valued information | | | ... |
| | | | | "0" | "1" | "2" | "3" | "0" | "1" | "2" | "3" | |
| | 7T | The next four valued information | "0" "1" "2" "3" | — — — — | $\Delta_{7201L}$ $\Delta_{7211L}$ $\Delta_{7221L}$ $\Delta_{7231L}$ | $\Delta_{7202L}$ $\Delta_{7212L}$ $\Delta_{7222L}$ $\Delta_{7232L}$ | $\Delta_{7203L}$ $\Delta_{7213L}$ $\Delta_{7223L}$ $\Delta_{7233L}$ | The next four valued information "0" "1" "2" "3" — — — — | $\Delta_{7301L}$ $\Delta_{7311L}$ $\Delta_{7321L}$ $\Delta_{7331L}$ | $\Delta_{7302L}$ $\Delta_{7312L}$ $\Delta_{7322L}$ $\Delta_{7332L}$ | $\Delta_{7303L}$ $\Delta_{7313L}$ $\Delta_{7323L}$ $\Delta_{7333L}$ | ... |

| | | | | | Amount of correction of a leading edge | | | |
|---|---|---|---|---|---|---|---|---|
| | | | | | Length of a unit recording area | | | |
| | | | | ... | 7T | | | |
| | | | | | Four valued information | | | |
| | | | | | "0" | "1" | "2" | "3" |
| Length of the next unit recording area | 2T | ... | The next four valued information | "0" "1" "2" "3" | — — — — | $\Delta_{2701L}$ $\Delta_{2711L}$ $\Delta_{2721L}$ $\Delta_{2731L}$ | $\Delta_{2702L}$ $\Delta_{2712L}$ $\Delta_{2722L}$ $\Delta_{2732L}$ | $\Delta_{2703L}$ $\Delta_{2713L}$ $\Delta_{2723L}$ $\Delta_{2733L}$ |
| | | | | | Four valued information | | | |
| | | | | | "0" | "1" | "2" | "3" |
| | 3T | ... | The next four valued information | "0" "1" "2" "3" | — — — — | $\Delta_{3701L}$ $\Delta_{3711L}$ $\Delta_{3721L}$ $\Delta_{3731L}$ | $\Delta_{3702L}$ $\Delta_{3712L}$ $\Delta_{3722L}$ $\Delta_{3732L}$ | $\Delta_{3703L}$ $\Delta_{3713L}$ $\Delta_{3723L}$ $\Delta_{3733L}$ |
| ... ... | | | | | | | | |
| | | | | | Four valued information | | | |
| | | | | | "0" | "1" | "2" | "3" |
| | 7T | ... | The next four valued information | "0" "1" "2" "3" | — — — — | $\Delta_{7701L}$ $\Delta_{7711L}$ $\Delta_{7721L}$ $\Delta_{7731L}$ | $\Delta_{7702L}$ $\Delta_{7712L}$ $\Delta_{7722L}$ $\Delta_{7732L}$ | $\Delta_{7703L}$ $\Delta_{7713L}$ $\Delta_{7723L}$ $\Delta_{7733L}$ |

FIGS. 6(a) to 6(e) show signal waveforms and the state of marks recorded on a track in a multi-value recording method of this embodiment and correspond to FIG. 2(a) to 2(e), respectively. In FIG. 6, e.g., when four-valued information to be recorded is "3", the preceding information is "0", the length of a unit recording area to be recorded is 3T and the length of the preceding unit recording area is 5T, the leading edge of a recording pulse is delayed by $\Delta_{5303F}$. When the four-valued information to be recorded is "3", the next information is "2", the length of the unit recording area to be recorded is 3T and the length of the next unit recording area is 2T, the trailing edge is advanced by $\Delta_{3232L}$.

The above operation can correct the variation in thermal interference resulting from various differences in lengths of a unit recording area itself and the preceding and next unit recording areas. Therefore, marks can be recorded at more precise edge positions.

Figure 6:
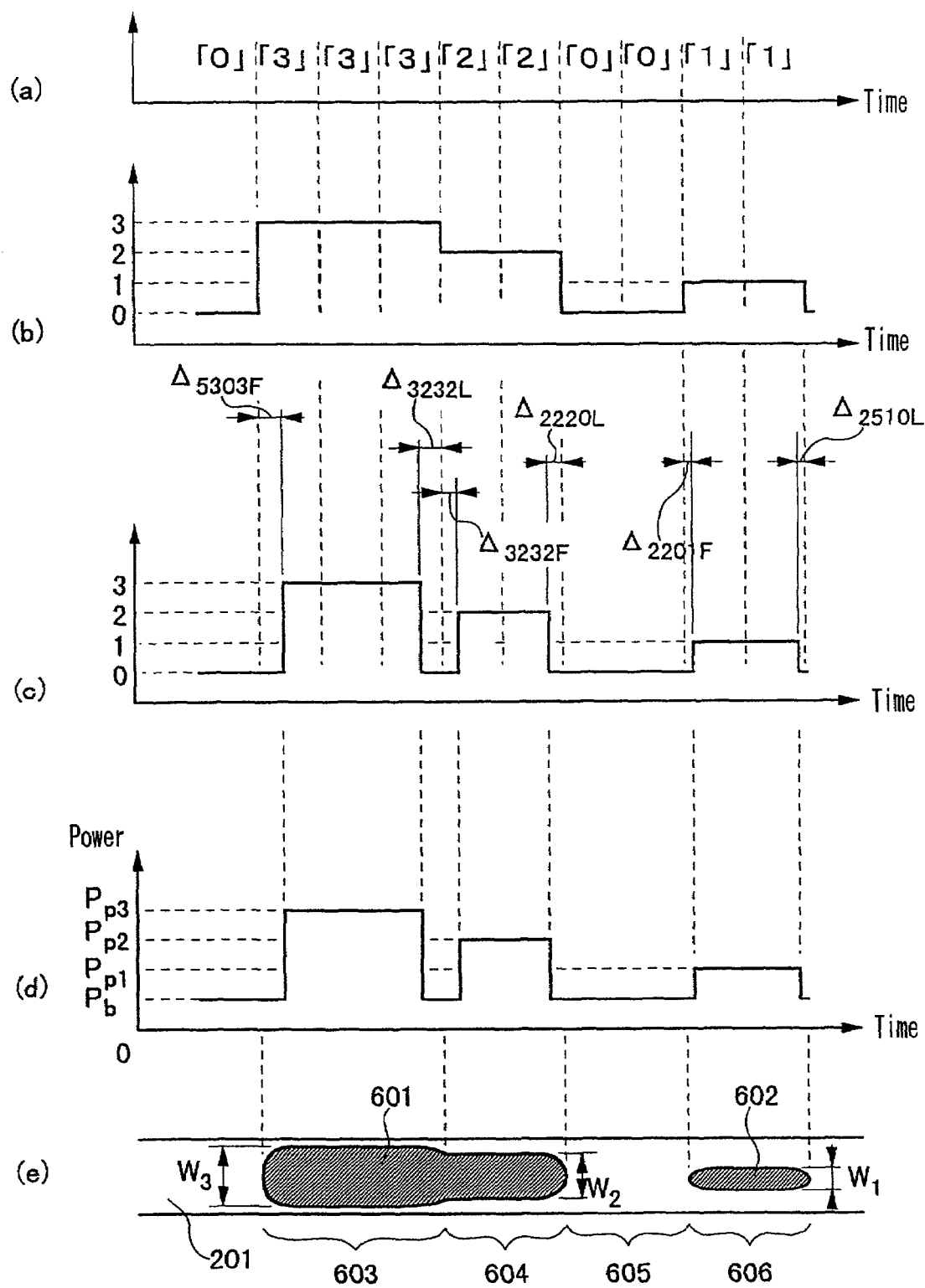
FIGS. 6(a) to 6(e) are signal waveform diagrams and a track state diagram that illustrate a recording operation of yet another embodiment of a recording method of the present invention.

The embodiment shown in FIG. 6 also allows recording marks 601 and 602, each having a predetermined length, to be formed on a track 201, which enables precise formation of unit recording areas 603 (with a width of $W_3$), 604 (with a width of $W_2$), 605 (with zero width) and 606 (with a width of $W_1$).

In an optical information recording method of this embodiment, it is preferable that prior to recording information, the amount of correction of the leading and trailing edge positions of a recording pulse is determined by recording and reproducing a predetermined recording test pattern. This method can determine the optimum amount of correction for an optical information recording medium to be used in recording information. Therefore, even if the optical information recording medium has recording characteristic variations, information can be recorded accurately.

In an optical information recording method of this embodiment, it is preferable that prior to reproducing information, reproduction conditions for the information are determined by reproducing a predetermined reproduction test pattern recorded on the optical information recording medium. This method can determine the optimum reproduction conditions (such as equalizer characteristics) for an optical information recording medium to be used in recording information. Therefore, information can be reproduced accurately even if the shapes of marks are varied due to the recording characteristic variations of the optical information recording medium.

It is preferable that an optical information recording method of this embodiment includes a process for selecting whether information is represented by the width of a unit recording area according to the type of information. This method allows information to be represented by only mark edge positions when the information to be recorded requires a particularly low error rate. Therefore, the method can select recording with high recording density or low error rate according to the information to be recorded, thus providing optimum recording based on the information.

For an optical information recording medium on which information is recorded with an optical information recording method of this embodiment, it is preferable that an identifier for identifying whether information is represented by the width of a unit recording area is recorded on a predetermined area of the medium. A recording/reproducing apparatus that uses this medium can recognize easily whether information recorded on the medium is represented by the width of a unit recording area by reproducing the identifier.

For an optical information recording medium on which information is recorded with an optical information recording method of this embodiment, it is preferable that the amount of correction of the leading and trailing edge positions of a recording pulse is recorded previously on a predetermined area of the medium as information. The use of this medium enables recording with the optimum amount of correction that has been recorded thereon. Thus, even if the optical information recording medium has recording characteristic variations, information can be recorded accurately without determining the amount of correction by recording/reproducing a test pattern.

A material for the optical disk is not limited to that described above, and the above method can be applied to any media, as long as they have optical characteristics that differ in the recording mark and non-mark portions, such as made of a magneto-optical material, dye material, or the like. The number of values that information has after conversion, the above recording power, modulation system, length and position of each pulse, or the like are not limited to those mentioned in the present embodiments; it should be noted that the invention can set these elements appropriately according to recording conditions or media. For example, in the above embodiments, each of the unit recording areas is recorded with a single recording pulse. However, the recording pulse may be composed of a multipulse.

INDUSTRIAL APPLICABILITY

As described above, the present invention selects at least one appropriate factor from the widths and lengths of a unit recording area to be recorded and the preceding and next unit recording areas, and corrects the leading and/or trailing edge positions of a recording pulse according to the factor (when a plurality of factors are selected, a combination of those factors is used). The present invention can provide a special effect of recording and reproducing multi-valued information accurately with the position correction. In view of such effect, it is obvious that the present invention is very useful in the field of optical information recording.

The invention claimed is:

1. An optical information recording method, comprising recording information as a mark by irradiating an optical information recording medium with a laser beam while varying a waveform of power of the laser beam to cause a change in optical characteristics of a photosensitive recording film,
wherein an area in the mark where a width of the mark is constant and a space area where the width is zero each are defined as a unit recording area,
information is represented by at least three different widths of the unit recording areas, and
the unit recording area having a predetermined length and a predetermined width is formed by correcting leading and trailing edge positions of a recording pulse for recording the unit recording area other than the space area in accordance with a width of the unit recording area to be recorded.

2. The optical information recording method according to claim 1, wherein the unit recording area having a predetermined length and a predetermined width is formed by correcting the leading and trailing edge positions of the recording pulse in accordance with a combination of a width and a length of the unit recording area to be recorded.

3. The optical information recording method according to claim 2, wherein the unit recording area having a predetermined length and a predetermined width is formed by correcting the leading edge position of the recording pulse in accordance with a combination of a width of the unit recording area to be recorded, a length thereof and a length of the preceding unit recording area and by correcting the trailing edge position of the recording pulse in accordance with a combination of a width of the unit recording area to be recorded, a length thereof and a length of the next unit recording area.

4. The optical information recording method according to claim 1, wherein amounts of correction of the leading and trailing edge positions of the recording pulse are determined by recording and reproducing a predetermined recording test pattern before recording the information.

5. The optical information recording method according to claim 1, wherein a predetermined reproduction test pattern is recorded on the optical information recording medium so as to determine reproduction conditions of the information by reproducing the reproduction test pattern before reproducing the information.

6. The optical information recording method according to claim 1, wherein information is further represented by the leading and trailing edges of the unit recording area.

7. The optical information recording method according to claim 1, wherein power of the laser beam is lowered to a bias level in a portion between a first recording pulse for recording a first unit recording area and a second recording pulse for recording a second unit recording area when the first and second unit recording areas, each having a different mark width other than zero, are recorded continuously as the unit recording areas.

8. The optical information recording method according to claim 1, further comprising selecting whether the information is represented by a width of the unit recording area or by edges of the mark in accordance with a type of information.

9. An optical information recording method, comprising recording information as a mark by irradiating an optical information recording medium with a laser beam while varying a waveform of power of the laser beam to cause a change in optical characteristics of a photosensitive recording film,
   wherein an area in the mark where a width of the mark is constant and a space area where the width is zero each are defined as a unit recording area,
   information is represented by at least three different widths of the unit recording areas, and
   the unit recording area having a predetermined length and a predetermined width is formed by correcting a leading edge position of a recording pulse for recording the unit recording area other than the space area in accordance with a combination of a width of the unit recording area to be recorded and a width of the preceding unit recording area and by correcting a trailing edge position of the recording pulse in accordance with a combination of a width of the unit recording area to be recorded and a width of the next unit recording area.

10. The optical information recording method according to claim 9, wherein the unit recording area having a predetermined length and a predetermined width is formed by correcting the leading edge position of the recording pulse in accordance with a combination of a width of the unit recording area to be recorded, a width of the preceding unit recording area and a length of the unit recording area to be recorded and by correcting the trailing edge position of the recording pulse in accordance with a combination of a width of the unit recording area to be recorded, a width of the next unit recording area and a length of the unit recording area to be recorded.

11. The optical information recording method according to claim 10, wherein the unit recording area having a predetermined length and a predetermined width is formed by correcting the leading edge position of the recording pulse in accordance with a combination of a width of the unit recording area to be recorded, a width of the preceding unit recording area, a length of the unit recording area to be recorded and a length of the preceding unit recording area and by correcting the trailing edge position of the recording pulse in accordance with a combination of a width of the unit recording area to be recorded, a width of the next unit recording area, a length of the unit recording area to be recorded and a length of the next unit recording area.

12. The optical information recording method according to claim 9, wherein amounts of correction of the leading and trailing edge positions of the recording pulse are determined by recording and reproducing a predetermined recording test pattern before recording the information.

13. The optical information recording method according to claim 9, wherein a predetermined reproduction test pattern is recorded on the optical information recording medium so as to determine reproduction conditions of the information by reproducing the reproduction test pattern before reproducing the information.

14. The optical information recording method according to claim 9, wherein information is further represented by the leading and trailing edges of the unit recording area.

15. The optical information recording method according to claim 9, wherein power of the laser beam is lowered to a bias level in a portion between a first recording pulse for recording a first unit recording area and a second recording pulse for recording a second unit recording area when the first and second unit recording areas, each having a different mark width other than zero, are recorded continuously as the unit recording areas.

16. The optical information recording method according to claim 9, further comprising selecting whether the information is represented by a width of the unit recording area or by edges of the mark in accordance with a type of information.

17. An optical information recording medium, comprising a photosensitive recording film whose optical characteristics are changed by laser beam irradiation,
   wherein an area where a width of a mark that is formed on the photosensitive recording film by the laser beam irradiation is constant and a space area where the width is zero each are defined as a unit recording area, and
   an identifier for identifying whether information is represented by a width of the unit recording area is recorded previously on a predetermined area.

18. An optical information recording medium, comprising a photosensitive recording film whose optical characteristics are changed by laser beam irradiation,
   wherein an area where a width of a mark that is formed on the photosensitive recording film by the laser beam irradiation is constant and a space area where the width is zero each are defined as a unit recording area, and
   amounts of correction of leading and trailing edge positions of a recording pulse for recording the unit recording area other than the space area that are determined by a width of the unit recording area to be recorded are recorded previously on a predetermined area as information.

19. An optical information recording apparatus for recording information on an optical information recording medium,
   the optical information recording medium being irradiated with a laser beam having a plurality of powers while switching the power of the laser beam to cause a change in optical characteristics of a photosensitive recording film so that a mark is formed,
   wherein an area in the mark where a width of the mark is constant and a space area where the width is zero each are defined as a unit recording area, and information is represented by at least three different widths of the unit recording areas, the apparatus comprising:

a modulation means for modulating recording information to provide modulated information;

a multi-valued means for converting the modulated information to multi-valued information;

a recording pulse generation means for generating a recording pulse based on the multi-valued information;

a recording power control means for controlling a recording power in accordance with a width of the unit recording area to be recorded that corresponds to the multi-valued information;

an edge position correction means for correcting leading and trailing edge positions of the recording pulse in accordance with the width of the unit recording area to be recorded; and a recording means for recording the information on the optical information recording medium by irradiation of the laser beam based on the recording power and the corrected recording pulse.

20. The optical information recording apparatus according to claim 19, wherein the edge position correction means corrects the leading and trailing edge positions of the recording pulse in accordance with a combination of a width and a length of the unit recording area to be recorded.

21. The optical information recording apparatus according to claim 20, wherein the edge position correction means corrects the leading edge position of the recording pulse in accordance with a combination of a width of the unit recording area to be recorded, a length thereof and a length of the preceding unit recording area and the trailing edge position of the recording pulse in accordance with a combination of a width of the unit recording area to be recorded, a length thereof and a length of the next unit recording area.

22. An optical information recording apparatus for recording information on an optical information recording medium, the optical information recording medium being irradiated with a laser bean having a plurality of powers while switching the power of the laser beam to cause a change in optical characteristics of a photosensitive recording film so that a mark is formed, wherein an area in the mark where a width of the mark is constant and a space area where the width is zero each are defined as a unit recording area, and information is represented by at least three different widths of the unit recording areas, the apparatus comprising:

a modulation means for modulating recording information to provide modulated information;

a multi-valued means for converting the modulated information to multi-valued information;

a recording pulse generation means for generating a recording pulse based on the multi-valued information;

a recording power control means for controlling a recording power in accordance with a width of the unit recording area to be recorded that corresponds to the multi-valued information;

an edge position correction means for correcting a leading edge position of the recording pulse in accordance with a combination of a width of the unit recording area to be recorded and a width of the preceding unit recording area and for correcting a trailing edge position of the recording pulse in accordance with a combination of a width of the unit recording area to be recorded and a width of the next unit recording area; and a recording means for recording the information on the optical information recording medium by irradiation of the laser beam based on the recording power and the corrected recording pulse.

23. The optical information recording apparatus according to claim 22, wherein the edge position correction means corrects the leading edge position of the recording pulse in accordance with a combination of a width of the unit recording area to be recorded, a width of the preceding unit recording area and a length of the unit recording area to be recorded, and the trailing edge position of the recording pulse in accordance with a combination of a width of the unit recording area to be recorded, a width of the next unit recording area and a length of the unit recording area to be recorded.

24. The optical information recording apparatus according to claim 23, wherein the edge position correction means corrects the leading edge position of the recording pulse in accordance with a combination of a width of the unit recording area to be recorded, a width of the preceding unit recording area, a length of the unit recording area to be recorded and a length of the preceding unit recording area, and the trailing edge position of the recording pulse in accordance with a combination of a width of the unit recording area to be recorded, a width of the next unit recording area, a length of the unit recording area to be recorded and a length of the next unit recording area.

\* \* \* \* \*

UNITED STATES PATENT AND TRADEMARK OFFICE
CERTIFICATE OF CORRECTION

PATENT NO. : 7,193,947 B1  Page 1 of 1
APPLICATION NO. : 09/980109
DATED : March 20, 2007
INVENTOR(S) : Narumi et al.

It is certified that error appears in the above-identified patent and that said Letters Patent is hereby corrected as shown below:

Column 21, line 39(claim 22): "bean" should read --beam--.

Signed and Sealed this

Sixteenth Day of October, 2007

JON W. DUDAS
*Director of the United States Patent and Trademark Office*